United States Patent
Narasimhan et al.

(10) Patent No.: US 6,783,749 B2
(45) Date of Patent: Aug. 31, 2004

(54) GAS RECOVERY PROCESS

(75) Inventors: Natarajan Narasimhan, Highland Park, NJ (US); Ramakrishnan Ramachandran, Allendale, NJ (US); Satish S. Tamhankar, Scotch Plains, NJ (US); Weibin Jiang, New Providence, NJ (US)

(73) Assignee: The BOC Group, Inc., New Providence, NJ (US)

( * ) Notice: Subject to any disclaimer, the term of this patent is extended or adjusted under 35 U.S.C. 154(b) by 104 days.

(21) Appl. No.: 10/144,489

(22) Filed: May 13, 2002

(65) Prior Publication Data

US 2003/0208960 A1 Nov. 13, 2003

(51) Int. Cl.⁷ ............................................. C01B 3/00
(52) U.S. Cl. ........................ 423/648.1; 423/437.2; 423/651; 252/373
(58) Field of Search .................. 423/651, 437.2; 252/373

(56) References Cited

U.S. PATENT DOCUMENTS

| | | | |
|---|---|---|---|
| 4,522,894 A | 6/1985 | Hwang et al. | 429/17 |
| 4,844,837 A | 7/1989 | Heck et al. | 252/373 |
| 4,927,857 A | 5/1990 | McShea, III et al. | |
| 5,023,276 A | 6/1991 | Yarrington et al. | 514/703 |
| 5,106,590 A | 4/1992 | Hopper et al. | 422/198 |
| 5,486,313 A | 1/1996 | De Jong et al. | 252/373 |
| 5,510,056 A | 4/1996 | Jacobs et al. | 252/373 |
| 5,639,401 A | 6/1997 | Jacobs et al. | 252/373 |
| 5,648,582 A | 7/1997 | Schmidt et al. | 585/652 |
| 5,654,491 A | 8/1997 | Goetsch et al. | 568/469.9 |
| 5,658,497 A | 8/1997 | Kumar et al. | 252/373 |
| 5,669,960 A | 9/1997 | Couche | |
| 5,720,901 A | 2/1998 | De Jong et al. | 252/373 |
| 5,883,138 A | 3/1999 | Hershkowitz et al. | 518/703 |
| 5,980,857 A | 11/1999 | Kapoor et al. | |
| 6,092,921 A | 7/2000 | Wentinck et al. | 366/174.1 |

FOREIGN PATENT DOCUMENTS

| | | |
|---|---|---|
| EP | 0 212 889 A2 | 3/1987 |
| EP | 0 303 438 A2 | 2/1989 |
| EP | 0 640 559 A1 | 3/1995 |
| EP | 0 640 561 A1 | 3/1995 |
| EP | 0 842 894 A1 | 5/1998 |
| FR | 2 823 192 A1 | 10/2002 |
| WO | WO 97/37929 | 10/1997 |

OTHER PUBLICATIONS

D.A. Hickman, E.A. Haupfear, L.D. Schmidt; "Synthesis Gas Formation by Direct Oxidation of Methane Over Rh Monoliths," Catalysis Letters 17 (1993) 223–227; Feb. Nos. 3/4, Baxel, CH.

Primary Examiner—Stanley S. Silverman
Assistant Examiner—Maribel Medina
(74) Attorney, Agent, or Firm—Philip H. Von Neida

(57) ABSTRACT

Improved method for recovering hydrogen and carbon monoxide from hydrocarbon conversion processes are disclosed. A monolith catalyst reactor means is utilized in treating the waste gas stream from the hydrocarbon conversion process to assist in recovering hydrogen and carbon monoxide from the waste gas stream. The present invention also provides a method for improving the yield of hydrogen and carbon monoxide from a hydrocarbon conversion process utilizing a monolith catalyst reactor means.

35 Claims, 3 Drawing Sheets

GAS RECOVERY PROCESS

FIELD OF THE INVENTION

The present invention relates to improvements in processes for producing hydrogen, carbon monoxide and syngas. More particularly, the present invention provides for improving the yield of hydrogen and carbon monoxide from a hydrocarbon conversion process utilizing a catalytic partial oxidation reaction process.

BACKGROUND OF THE INVENTION

In many refining and petro-chemical plants, waste streams are generated; typically containing unconverted hydrocarbons, hydrogen, carbon oxides and inerts. These streams are usually present at low pressures and are generally used as fuel in other processes within the complex. Higher profits can be realized if these waste streams are economically converted to higher value products and used as chemical feedstock. Therefore, processes, which can achieve this goal, are of great interest. One such process, with potential for improvement, is the conversion of hydrocarbons to hydrogen and carbon monoxide.

The conversion of hydrocarbons to hydrogen and carbon monoxide containing gases is well known in the art. Examples of such processes include catalytic steam reforming, catalytic autothermal reforming, catalytic partial oxidation and non-catalytic partial oxidation. Each of these processes has advantages and disadvantages and they produce various ratios of hydrogen and carbon monoxide, also known as synthesis gas or syngas.

Most commercial plants for producing hydrogen as the main product are based on the Steam Methane Reforming (SMR) process. An SMR plant consists of a furnace containing several tubes filled with a reforming catalyst. A pre-heated mixture of steam and a source of methane, such as natural gas, is fed to the reactor tubes, wherein they react at temperatures in excess of about 800 C. to form a mixture of $H_2$, CO and $CO_2$ by the highly endothermic reforming reaction. The heat required for the reaction is provided by combustion of fuels with air in the furnace surrounding the tubes. The gas mixture exiting the SMR reactor is passed through another reactor, wherein majority of the CO reacts with steam to form $H_2$ and $CO_2$. In most hydrogen and syngas generation plants, pressure swing adsorption or PSA is used as a process step for the final purification of hydrogen or for splitting the raw gas stream into specified syngas products. The PSA process step generally produces a waste gas stream that carries unrecovered hydrogen, which can be from 10–20% of the hydrogen fed to the PSA process, carbon monoxide and the unconverted hydrocarbon from the original feedstock.

Typically, this waste gas from the PSA only fetches fuel value in the production of hydrogen, carbon monoxide and syngas, as it is recycled back for input into the SMR furnace. In some instances, such as in the methanol production process, the syngas generated by the primary hydrocarbon conversion process is fed to the methanol producing plant, which in turn produces a waste gas stream containing H2, CO, $CH_4$ and $CO_2$. This waste stream is also typically used as fuel in some part of the process.

The present inventors have invented a process, whereby the waste gas stream from the PSA or other processes is further reacted in a partial oxidation reactor and purified such that a significantly higher yield of hydrogen and carbon monoxide is obtained from the overall hydrocarbon conversion process.

Partial oxidation processes convert hydrocarbon containing gases such as natural gas or naphtha to hydrogen, carbon monoxide and other trace components such as carbon dioxide, water, and other hydrocarbons. The process is typically carried out by injecting preheated hydrocarbons and an oxygen-containing gas into a combustion chamber where oxidation of the hydrocarbons occurs with a less than stoichiometric amount of oxygen for complete combustion. This reaction is conducted at very high temperatures such as greater than 1000° C. and often in excess of 1300° C. and at pressures of up to 150 atmospheres. In some reactions, steam or carbon dioxide can also be injected into the combustion chamber to modify the syngas product and to adjust the ratio of hydrogen to carbon monoxide.

Catalytic partial oxidation is more efficient than non-catalytic partial oxidation in that it uses less oxygen. In this case, the exothermic partial oxidation reaction occurs over a catalyst at temperatures in the range of about 700 to about 1100 C. to produce a reaction product containing high concentrations of hydrogen and carbon monoxide. The catalysts used in these processes are typically noble metals such as platinum or rhodium and other transition metals such as nickel on a suitable support structure.

More recently, partial oxidation processes have been disclosed in which the hydrocarbon gas is contacted with the oxygen-containing gas at high space velocities in the presence of a catalyst such as a metal deposited on a ceramic foam monolith support. The monolith supports are impregnated with a noble metal such as platinum, palladium or rhodium, or other transition metals such as nickel, cobalt, chromium and the like. Typically, these monolith supports are prepared from solid refractory or ceramic materials such as alumina, zirconia, magnesia and the like. During the operation of these reactions, the hydrocarbon feed gases and oxygen-containing gases are contacted with the metal catalyst at temperatures sufficient to initiate the reaction, at a standard gas hourly space velocity (GHSV) of over 10,000 $hour^{-1}$, and often over 100,000 $hour^{-1}$.

SUMMARY OF THE INVENTION

The present invention provides for an improved method for recovering hydrogen and carbon monoxide from a waste stream containing these gases along with unconverted hydrocarbons, such as a PSA waste gas stream from a hydrocarbon conversion process. The improvement comprises passing the waste gas stream along with an oxygen-containing gas stream through a monolith catalyst reactor, withdrawing the hydrogen and carbon monoxide from the reactor as a synthesis gas product, or further separating hydrogen and carbon monoxide as separate products. In another embodiment, the gas mixture produced is recycled back into the process or is stored as the final product.

The present invention also provides for means to improve the yield of hydrogen and carbon monoxide from a hydrocarbon conversion process by contacting the waste gas stream from the PSA step of the hydrocarbon conversion process and an oxygen-containing gas stream with a monolith catalyst thereby converting the remaining hydrocarbon to hydrogen and carbon monoxide, and separating the hydrogen and carbon monoxide from the product gas stream.

In a typical process for producing hydrogen, carbon monoxide or syngas, a hydrocarbon such as methane is provided to a hydrocarbon conversion reactor along with steam and optionally an oxygen-containing gas, and is reacted at a temperature of about 800 to 1000° C. The resulting products of hydrogen, carbon monoxide, carbon dioxide and unreacted methane are then passed to a shift reactor where further reaction of the unreacted hydrocarbon occurs. This gas stream is then directed to a pressure swing adsorption unit whereby hydrogen is separated as product from the gas mixture. The remaining gas, which does include some hydrogen, carbon dioxide, carbon monoxide, methane and nitrogen is at a low pressure and is directed to the monolith reactor. Oxygen is also fed into the monolith reactor and hydrogen, carbon monoxide and carbon dioxide are removed as products. If necessary, some hydrocarbon fuel may be added to the feed to maintain auto-thermal reactor operation. The hydrogen and carbon monoxide can then be removed from the system for employment in other processes.

Additionally, the present invention also provides for the recovery of the carbon dioxide, which also has utility in other processes. The present invention, therefore, provides for more complete conversion of a hydrocarbon feedstock to the hydrogen and carbon monoxide, and higher recovery of these valuable products compared to that achieved in typical hydrocarbon conversion processes. Process performance is also maintained with the inventive process in terms of the hydrocarbon usage as the reforming and conversion catalysts begin to decay. Thus, full output from a hydrogen or Syngas plant can also be maintained in the face of the reforming and conversion catalyst decay.

Additionally, the present invention further provides for an improved process for the co-production of hydrogen, carbon monoxide and carbon dioxide.

DETAILED DESCRIPTION OF THE INVENTION

Figure 1:
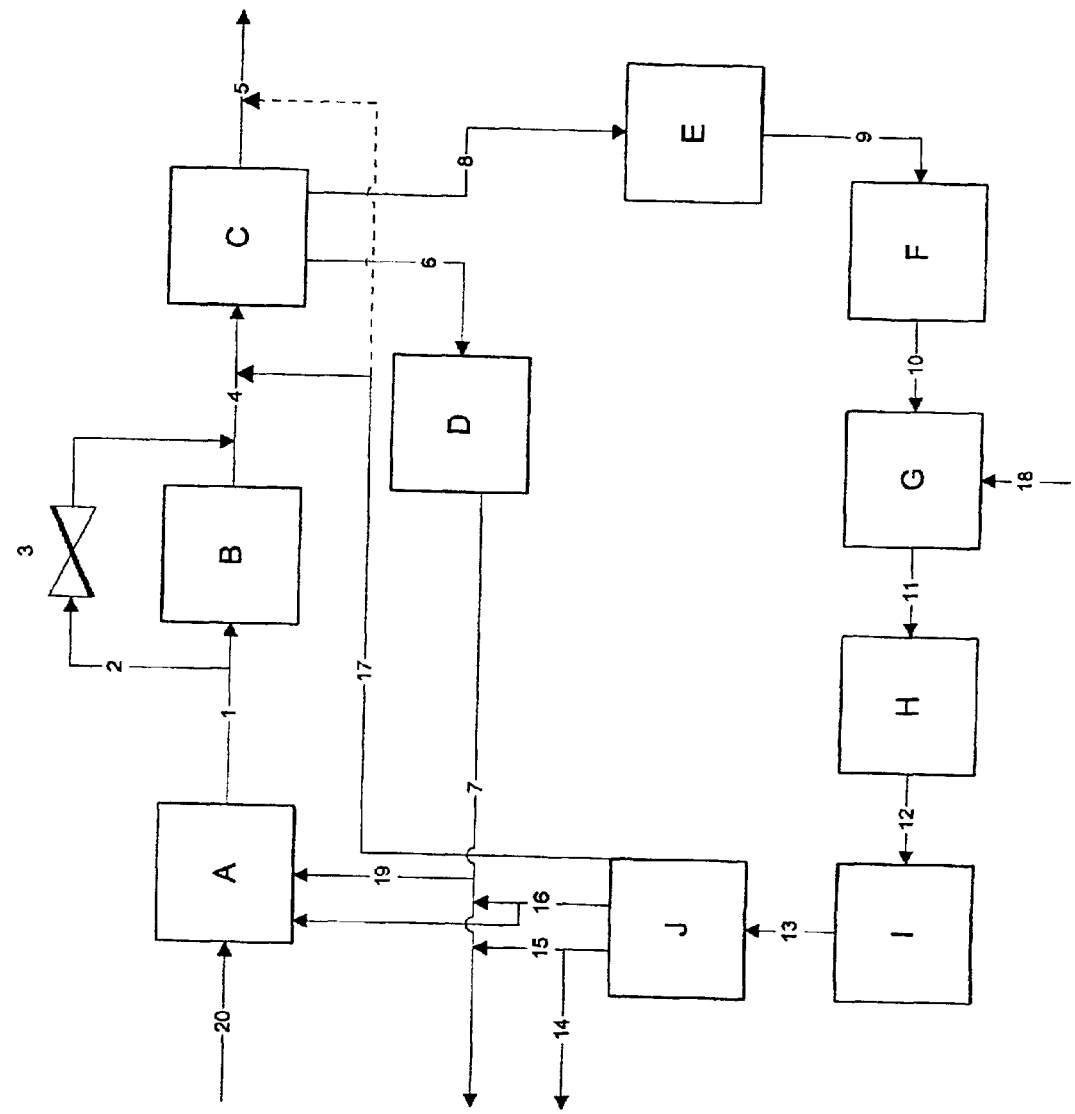
FIG. 1 is a schematic representation of a hydrocarbon conversion process whereby the monolith reactor process of the present invention is employed.

The present invention provides for an improved method for recovering hydrogen and carbon monoxide from a PSA waste gas stream of a hydrocarbon conversion process. The improvement comprises passing the waste gas stream and an oxygen-containing gas stream through a monolith catalyst reactor thereby recovering hydrogen and carbon monoxide. The present invention further provides for a method of improving the yield of hydrogen and carbon monoxide from a hydrocarbon conversion process, which comprises contacting the waste gas from the hydrocarbon conversion process and an oxygen-containing gas stream with a monolith catalyst in a reactor, thereby recovering further amounts of hydrogen and carbon monoxide over that obtained by the hydrocarbon conversion process by itself. Both of these processes comprise systems of monolith reactor means, compressor means, quench or heat recovery means and carbon monoxide, carbon dioxide, and hydrogen recovery means.

In the process of the present invention, the hydrocarbon containing feed gas which typically contains $C_1$ to $C_8$ alkanes or alkenes, with $C_1$ to $C_5$ alkanes preferred and methane most preferred, is fed to a hydrocarbon conversion reactor. Other sources of fuel may also be employed, including natural gas and certain refinery off-gases that contain methane or longer chain hydrocarbons. Gasoline, diesel, methanol and other fuel sources may also be adapted and employed in the hydrocarbon conversion reactor. An oxygen-containing gas, which is typically air but can include oxygen-enriched air, oxygen mixtures with other gases and pure oxygen is also optionally directed to the hydrocarbon conversion reactor. In the reactor, temperatures of 850 to 900° C. are employed to produce a gas mixture, which comprises hydrogen, carbon monoxide, carbon dioxide and unreacted hydrocarbon. This gas stream is directed to a shift reactor whereby further reaction of the hydrocarbon may occur. In the preferred embodiment of the process, the gas stream exiting the shift reactor is first treated in an acid Gas Removal (AGR) unit to recover majority of the carbon dioxide as a valuable by-product. The gas stream depleted of carbon dioxide is then directed to a pressure swing adsorption unit.

The pressure swing adsorption unit relies on selective adsorption of certain components of a gas mixture compared to other components of the gas mixture being separated from those other components by contacting the gas mixture with an appropriate adsorbent under conditions, which promote the adsorption of the strongly adsorbed components. Typically, these processes are carried out at ambient temperatures. The upper temperature limit at which adsorption can occur is generally about 400° C. and is preferably in the range of not greater than 50 to 70° C.

Typically, the minimum absolute pressure at which the adsorption step is carried out is as high as 50 bara (bar absolute) or more but is preferably carried out at absolute pressures preferably not greater than 20 bara and more preferably not greater than about 15 bara. In a typical PSA process, pressure during the regeneration step is reduced usually to an absolute pressure in the range of about 0.1 to about 5 bara and preferably in an absolute pressure range of about 0.2 to about 2 bara. Hydrogen is not adsorbed in this case, and therefore will leave the PSA unit at close to the feed pressure, while the remaining gases, which can include carbon monoxide, carbon dioxide, the hydrocarbon and nitrogen, as well as some unrecovered hydrogen from the void spaces in the adsorbent bed, will leave the PSA unit at a lower pressure. The lower pressure gas stream containing these components is then directed to the monolith reactor unit. Additional fuel may be added to the feed, if necessary, to sustain the desired reaction and to maintain the reactor temperature (auto-thermal operation).

The monolith reactor unit is a vessel or a pipe section with refractory lining, with the monolith catalyst situated within. The monolith catalyst is typically in the form of one or more circular disks made of refractory ceramic materials, such as alumina, zirconia, magnesia, ceria, etc., impregnated with a noble metal, such as rhodium, platinum, palladium and iridium with an appropriate loading. The disks are highly porous, foam-like structures. The reactor is provided with an inlet and an outlet pipe, respectively for providing the feed to the reactor and for withdrawing the product gases. There may be provision to preheat the feed before it enters the reactor. Typically, the catalytic monolith is sandwiched between blank monolith disks, which serve as heat shields, so as to retain the heat generated in the reactor within the catalytic monolith.

The reaction within the monolith reactor unit is typically conducted at pressures of about 0.2 bar to 3 bar and generally above 700° C. The remaining hydrocarbon present in the waste gas is partially oxidized in the process, producing additional carbon monoxide and hydrogen at very high yields, typically greater than 90%. The hydrogen and carbon monoxide that were already present in the feed waste gas remain generally unaltered. The short residence time required of the monolith reactor unit helps generate a clean gas with minimal co-production of soot. This high throughput accompanied by little pressure drop will realize significant capital cost savings. The monolith reactor unit effluent gas stream now consists primarily of hydrogen and carbon monoxide. After heat recovery in a quench or heat recovery unit, hydrogen and carbon monoxide can be recycled back to the hydrocarbon conversion process at appropriate locations within the process or independently processed to recover hydrogen, carbon monoxide or mixtures thereof. For more detailed description of the preset invention, reference is made to the accompanying FIGS. 1–3.

Turning now to FIG. 1, line 20 provides ingress into hydrocarbon conversion reactor means A. Typically, the hydrocarbon conversion reactor means include catalytic steam reforming, autothermal catalytic reforming, catalytic partial oxidation processes and non-catalytic partial oxidation processes. The hydrocarbon stream, steam and the optional oxygen containing gas stream will react within the hydrocarbon conversion reactor means at temperatures of approximately 700° C. to about 1300° C. The reaction products will exit the hydrocarbon conversion reactor means through line 1. Typically, this gas stream will comprise hydrogen, carbon monoxide, carbon dioxide and unreacted hydrocarbon, such as methane. This gas stream is directed to the shift reaction means B but can also be diverted via line 2 through valve 3 past the shift reaction means to line 4 which is the line entering the pressure swing adsorption process means C. Typically, the pressure swing adsorption process means will contain an adsorbent material, which would be useful for separating hydrogen from a gas stream. Typically, this adsorbent material is activated carbon or a zeolite 5A adsorbent material. The product of the pressure swing adsorption process would be hydrogen at high pressure, which will exit the PSA unit C through line 5. The remainder of the gas present in this stream will leave the PSA unit through line 8 as waste gas.

In this embodiment, during part of the cycle, carbon dioxide exits the pressure swing adsorption unit through line 6 and is directed to the carbon dioxide rich waste gas holder D. The carbon dioxide rich gas can then exit the gas holder through line 7 where it can be directed to carbon dioxide recovery or directed back to the hydrocarbon conversion reactor means A through line 19. The waste gas stream leaving the PSA unit C travels through line 8 to the balance waste gas holder E, which directs the waste gas stream through line 9 to the waste gas feed compressor F. The compressed waste gas stream is directed through line 10 to the monolith reactor means G. The oxygen-containing gas stream is directed to the monolith reactor means through line 18.

The reacted product comprising hydrogen, carbon monoxide and carbon dioxide leaves the monolith reactor means through line 11 to quench or heat recovery means H. This quenched gas stream is then fed through line 12 to a product waste gas compressor 1. This cooled and compressed gas stream is directed to the carbon monoxide recovery unit J through line 13. The carbon monoxide recovery unit can be an amine wash, a dryer, a cold box, a membrane process, or a carbon monoxide selective absorption solvent system whereby carbon monoxide is separated from the other components of the waste gas stream. The hydrogen is removed from the carbon monoxide recovery unit through line 17 whereby it can be directed back to line 4 just prior to entry of the original hydrocarbon conversion reaction means gas product into the PSA unit C or it may be combined with the $H_2$ product from PSA at line 5. The remainder waste gas is directed through line 16 where it will be directed to line 19 for re-entry back into the furnace used in the hydrocarbon conversion reactor means unit. Line 15 allows the recovered carbon dioxide to be directed either to line 7 for $CO_2$ recovery or through line 14 for raw $CO_2$ liquefaction purposes.

Figure 2:
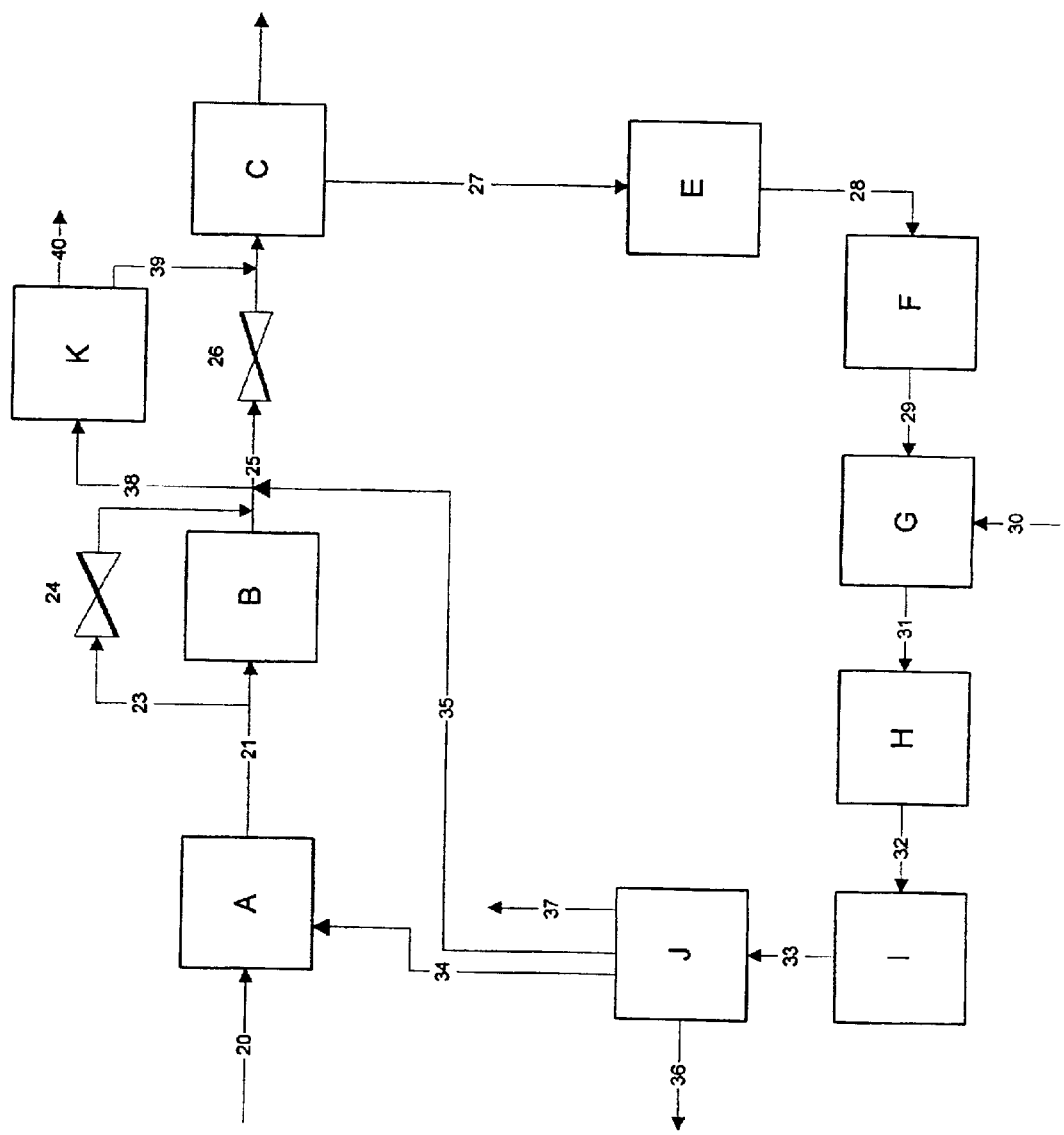
FIG. 2 is a schematic representation of a hydrocarbon conversion process whereby the monolith reaction process of the present invention is employed and carbon dioxide is recovered as product.

Turning now to FIG. 2, an alternative embodiment of the present invention is described therein. Line 20 directs hydrocarbon feed to the hydrocarbon conversion reactor means A. The reaction products exit through line 21 to the shift reactor B but also may be bypassed around the shift reactor through line 23, valve 24, to line 25. The gas mixture leaving the shift reactor B is directed through line 25 and valve 26 to the pressure swing adsorption unit C. Optionally before going to the PSA unit C, the gas leaving shift reactor B may be directed to the $CO_2$ recovery unit K through line 38. Line 39 then provides the $CO_2$ depleted gas stream to the PSA unit C. The carbon dioxide leaves unit K through line 40. The waste gas leaving the pressure swing adsorption unit leaves through line 27 to a balance waste gas holder means E. The waste gas then exits through line 28 to a waste gas feed compressor F, which directs the compressed waste gas to the monolith reactor unit means G through line 29. Line 30 provides input for the oxygen-containing gas. The gas stream leaving the monolith reactor unit means G is primarily comprised of hydrogen, carbon monoxide and carbon dioxide, which is directed through line 31 to H, the quench or heat recovery means.

The quenched gas stream is directed along line 32 to a product gas compressor unit means 1, which directs the compressed gas along line 33 to the carbon monoxide recovery means J. The recovered carbon monoxide product leaves the recovery unit J through line 36. The waste gas remaining from the CO recovery process exits through line 34 where it is re-introduced back into the hydrocarbon conversion reactor means A. Additionally, the carbon dioxide exits through line 37 where it may be recovered for other uses in the process or for uses elsewhere. The hydrogen recovered in Unit J leaves through line 35 and is directed back up to line 25 for entry into PSA unit C.

Figure 3:
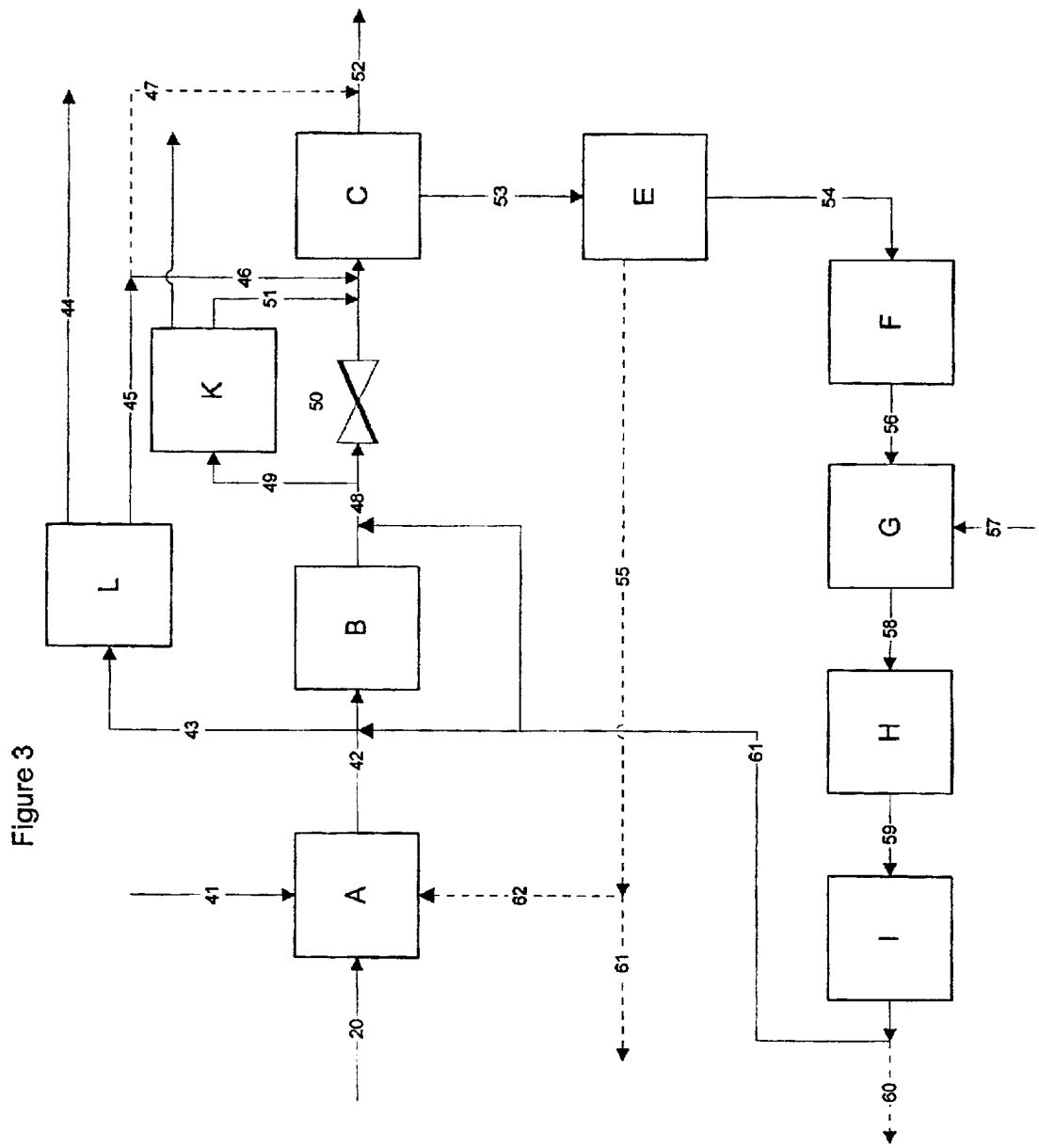
FIG. 3 is a schematic representation of a hydrocarbon conversion process utilizing the monolith reactor process showing carbon monoxide and hydrogen recovery and also carbon dioxide removal and recovery.

Turning now to FIG. 3, an alternative embodiment of the present invention is described therein. Hydrocarbons as feed are directed through line 20 into the hydrocarbon conversion reactor means A. Fuel is also directed into the hydrocarbon conversion reactor means through line 41. The reaction product is directed through line 42 to shift reaction unit B. The gas stream exiting the shift reactor passes through line 48 to bypass valve 50 to the pressure swing adsorption unit C. The product gas from shift reactor B in line 48 may be optionally directed through line 49 to $CO_2$ recovery means K. The $CO_2$-depleted stream 51 from this unit can then be returned to join the feed line to the PSA unit C. Hydrogen product exits the PSA unit through line 52. The waste gas stream exits the PSA unit through line 53 to the waste gas holder unit E. A part of the waste gas is returned to the furnace of the hydrocarbon conversion reactor means A through line 55 to 62 as fuel or as a fuel by-product through line 61 for use in other processes.

The remaining waste gas leaves the waste gas holder E through line 54 to a waste gas compressor unit F which directs the compressed gas stream to the monolith reactor unit means G through line 56. Line 57 provides the oxygen-containing gas to the monolith reactor unit means. The reacted product is then directed through line 58 to the quench or heat recovery unit means H which then directs the quenched reaction product gas stream to a recycle compressor I through line 59. The hydrogen/carbon monoxide mixture can then be removed through line 60 or directed through line 61 to combine with the product gas from hydrocarbon conversion unit A in line 42. The product gas from the hydrocarbon conversion reactor A flowing through line 42 is optionally directed through line 43 to a carbon monoxide recovery unit L. The carbon monoxide recovery unit will direct carbon monoxide as product through line 44, but also return hydrogen co-product along lines 45 to 46, where it may enter the pressure swing adsorption unit C. Optionally the hydrogen by-product in line 45 is directed to the hydrogen product line 52 through line 47.

EXAMPLES

The following are included to demonstrate the invention but are not meant to be limiting thereof.

A. Catalyst Preparation

The catalysts were prepared by impregnating a foam monolith with saturated solutions of rhodium nitrate in water. After the monolith was saturated and dried in air, it was calcined in air at 550° C. for 5 hours and reduced in pure hydrogen at 550° C. for 6 hours. This procedure resulted in metal loading of approximately 2–5 wt %. The monoliths used were 0.73-inch-diameter, 0.93-inch-long, were made of $ZrO_2$ foam, with or without a coating of 10% $CeO_2$, and had macro-pores of nominal size expressed as 45 pores per linear inch (45 ppi).

B. Experimental Test Procedure

The apparatus consisted of stainless steel reactor tube, 5 inch long with 0.9 inch inside diameter. The catalyst, described above, was wrapped with a thin layer of Zirconia insulation to prevent gases from bypassing the catalyst. Inert $Al_2O_3$ foam monoliths before and after the catalyst minimized radiant heat losses in the axial direction. The gases were premixed prior to entering the reaction zone. The product lines were quenched with water to prevent carbon deposition. An on-line GC and a NOVA gas analyzer were used to analyze reaction products. Total gas flow rates ranged from 10 to 20 SLPM. The reaction temperature was measured with a thermocouple located between the downstream radiation shield and the catalytic monolith. The overall pressure of the system was maintained at 1.6 ATM to overcome the pressure drop in the system.

To start an experiment, the catalyst was preheated, in a flow of nitrogen, by electrically heating the reactor tube containing the catalyst. After the desired temperature was reached, the flow of nitrogen was stopped and the flow of desired gas mixture containing $CH_4$, $H_2$, CO and $O_2$ was begun. Ignition in the above mixture occurred on the catalyst surface between 100 and 200° C. depending on the feed composition, and it is indicated by a rapid increase in temperature to between 600 and 1100° C. To shut down the reactor, $O_2$ was first turned off, and then the other gases were turned off. Proper care was taken to ascertain that no flammable conditions existed within the system.

Calculation of Conversion and Selectivity

Since nitrogen was not consumed or formed in the reaction, the $N_2$ peak was used as a calibration for mass balance. $CH_4$ conversion, $H_2$ conversion, CO and $H_2$ selectivity (on a carbon and hydrogen atom basis) are defined as follows:

$$CH_4 conv = \frac{F_{CH_4,in} - F_{CH_4,out}}{F_{CH_4,in}}$$

$$H_2 conv = \frac{F_{H_2}*}{F_{H_2,in}}$$

$$S_{CO} = \frac{F_{CO}}{F_{CO} + F_{CO_2}}$$

$$S_{H_2} = \frac{F_{H_2,out} - F_{H_2,in}}{F_{H_2,out} - F_{H_2,in} + F_{H_2O,out}},$$

where $F_{H2}*$ refers to the amount of input hydrogen which formed water. It was calculated through total amount of water formulated minus water formed by methane oxidation. The quantity of water was determined from oxygen and hydrogen atom balances. Both carbon and hydrogen atom balances closed to within ±5%.

TABLE 1

Partial oxidation of PSA waste gas

| support: | 45 ppi, Zirconia monolith | Temperature: | 25 C. |
|---|---|---|---|
| Dimension: | 0.73 × 0.39 inch | Pressure: | 10 psig |
| PSA waste gas composition | 48% H2; 20% CO; 29% CH4 | | |

| | Total | | Product Composition | | | | | | CH4 Conv. | | H2 selectivity | | CO selectivity | |
|---|---|---|---|---|---|---|---|---|---|---|---|---|---|---|---|
| | flowrate SLPM | CH4/O2 Ratio | CH4 % | O2 % | H2 % | CO % | CO2 % | H2O % | Exp % | Cal. % | Exp % | Cal. % | Exp % | Cal. % |
| Catalyst | | | | | | | | | | | | | | |
| 5% Rh/ZrO2 | 7.5 | 1.48 | 4.8 | 0 | 59 | 28.4 | 1.7 | 4.1 | 77.9 | 97.5 | 65.4 | 87.4 | 94.3 | 92.6 |
| two 5% Rh/ZrO2 | 7.5 | 1.48 | 3.6 | 0 | 59.4 | 28.1 | 2.2 | 4.9 | 82.7 | 97.5 | 71.3 | 87.4 | 92.7 | 92.6 |
| two 2% Rh/10%/CeO2/ZrO2 | 7.5 | 1.48 | 2.7 | 0 | 60.5 | 28.2 | 1.7 | 5 | 86.2 | 97.5 | 78.5 | 87.4 | 94.3 | 92.6 |
| two 5% Rh/ZrO2 | 7.5 | 1.34 | 2.1 | 0 | 60.1 | 29.4 | 2.3 | 4.4 | 90.3 | 99.0 | 66.9 | 81.6 | 92.7 | 93.0 |
| two 5% Rh/ZrO2 | 15.1 | 1.34 | 5.1 | 0 | 57.9 | 29.3 | 2.1 | 3.6 | 77.3 | 99.9 | 55.3 | 81.6 | 93.3 | 93.0 |
| two 2% Rh/10%/CeO2/ZrO2 | 7.5 | 1.34 | 0.7 | 0 | 61.7 | 29.4 | 2.3 | 4.3 | 96.5 | 99.9 | 74.7 | 81.6 | 92.7 | 93.0 |
| two 2% Rh/10%/CeO2/ZrO2 | 15.1 | 1.34 | 0.9 | 0 | 61.2 | 29.5 | 1.9 | 4.8 | 95.3 | 99.9 | 71.0 | 81.6 | 93.9 | 93.0 |

1 Cal. value is based on Gibbs energy free equilibrium
2 H2 conversion is calculated through H, C, and O material balance
3 Effectively no feed hydrogen was consumed and H2 selectivity only referred to H2 formed by CH4
4 Both feed and product composition are balanced by N2

The present inventors anticipate that the processes of the present invention may also be employed for recovery and conversion of process purge gas from oxo-synthesis processes, methanol, ammonia, acetic acid, organic oxidation processes, catalytic reforming of naphtha, either high aromatic or high octane gasoline production, toluene hydrodealkylation and methane processing. In addition, the present inventors have discovered that the present invention allows for a cost effective recovery of carbon dioxide product that may be generated during both the hydrocarbon conversion reaction process and separated out through the PSA and monolith reactor unit means.

For example, in a methanol synthesis process, hydrogen and carbon monoxide make up the reactants utilized to synthesize the methanol. They also will leave the methanol reaction chamber along with unconverted hydrocarbons and some methanol as an unreacted waste gas stream, which can then be processed by the methods of the present invention and returned to the methanol synthesis reaction chamber.

While this invention has been described with respect to particular embodiments thereof, it is apparent that numerous other forms and modifications of the invention will be obvious to those skilled in the art. The appended claims of this invention generally should be construed to cover all such obvious forms and modifications which are within the true spirit and scope of the present invention.

Having thus described the invention, what we claim is:

1. An improved method for recovering hydrogen and carbon monoxide from the waste gas stream from a pressure swing adsorption process in a hydrocarbon conversion process, the improvement comprising passing said waste gas stream and an oxygen-containing gas stream through a monolith catalyst reactor, and recovering from said monolith catalyst reactor hydrogen and carbon monoxide.

2. The method as claimed in claim 1 wherein said waste gas stream comprises hydrogen, carbon monoxide, carbon dioxide, hydrocarbons and nitrogen.

3. The method as claimed in claim 1 wherein said oxygen-containing gas stream is selected from the group consisting of oxygen, air and oxygen-enriched air.

4. The method as claimed in claim 1 wherein said monolith catalyst is a refractory ceramic material impregnated with a noble metal.

5. The method as claimed in claim 1 wherein a reaction occurs in said monolith catalyst reactor.

6. The method as claimed in claim 1 further comprising adding hydrocarbon fuel to said monolith catalyst reactor.

7. The method as claimed in claim 5 wherein said reaction is the partial oxidation reaction of hydrocarbons to produce hydrogen and carbon monoxide.

8. The method as claimed in claim 5 wherein said reaction occurs at a pressure of about 0.2 to about 3 bar and a temperature above about 700° C.

9. The method as claimed in claim 1 wherein said improvement further comprises the steps of compressing said hydrogen and carbon monoxide from said monolith catalyst reactor; quenching said hydrogen and carbon monoxide from said monolith catalyst reactor; and recovering said carbon monoxide and recovering said hydrogen.

10. The method as claimed in claim 9 further comprising the step of recovering carbon dioxide from the said waste gas stream.

11. The method as claimed in claim 9 wherein carbon monoxide is recovered by an amine wash, dryer, cold box, membrane process, or a carbon monoxide selective absorption solvent system.

12. The method as claimed in claim 1 wherein said hydrogen is recycled to said pressure swing adsorption process.

13. The method as claimed in claim 1 wherein said carbon monoxide is recycled to said pressure swing adsorption process.

14. A method for improving the yield of hydrogen and carbon monoxide from a hydrocarbon conversion process comprising contacting the waste gas stream from said hydrocarbon conversion process and an oxygen-containing gas stream with a monolith catalyst reactor, and recovering from said monolith catalyst reactor hydroaen and carbon monoxide.

15. The method as claimed in claim 14 wherein said waste gas stream comprises hydrogen, carbon monoxide, carbon dioxide, hydrocarbons and nitrogen.

16. The method as claimed in claim 14 wherein said oxygen-containing gas stream is selected from the group consisting of oxygen, air and oxygen-enriched air.

17. The method as claimed in claim 14 wherein said monolith catalyst is a refractory ceramic material impregnated with a noble metal.

18. The method as claimed in claim 17 wherein a reaction occurs in said monolith catalyst reactor.

19. The method as claimed in claim 18 wherein said reaction is the partial oxidation reaction of hydrocarbons to produce hydrogen and carbon monoxide.

20. The method as claimed in claim 19 wherein said reaction occurs at a pressure of about 0.2 to about 3 bar and a temperature above 700° C.

21. The method as claimed in claim 14 further comprising the steps of compressing said hydrogen and carbon monoxide from said monolith catalyst reactor; quenching said hydrogen and carbon monoxide from said monolith catalyst reactor; and recovering said carbon monoxide and recovering said hydrogen.

22. The method as claimed in claim 21 further comprising the step of recovering carbon dioxide.

23. The method as claimed in claim 22 wherein carbon monoxide is recovered by an amine wash, dryer, cold box, membrane process, or a carbon monoxide selective absorption solvent system.

24. The method as claimed in claim 14 wherein said hydrogen is recycled to said pressure swing adsorption process.

25. The method as claimed in claim 14 wherein said carbon monoxide is recycled to said pressure swing adsorption process.

26. A system for recovering hydrogen and carbon monoxide from a pressure swing adsorption waste gas stream in a hydrocarbon conversion process comprising passing said waste gas stream and an oxygen-containing gas stream through monolith catalyst reactor means.

27. The system as claimed in claim 26 wherein said waste gas stream comprises hydrogen, carbon monoxide, carbon dioxide, hydrocarbons and nitrogen.

28. The system as claimed in claim 26 wherein said oxygen-containing gas stream is selected from the group consisting of oxygen, air and oxygen-enriched air.

29. The system as claimed in claim 26 wherein said monolith catalyst means comprise a refractory ceramic material impregnated with a noble metal.

30. The system as claimed in claim 26 wherein a reaction occurs in said monolith catalyst reactor.

31. The system as claimed in claim 30 wherein said reaction is the partial oxidation reaction of hydrocarbons into hydrogen and carbon monoxide.

32. The system as claimed in claim 30 wherein said reaction occurs at a pressure of about 0.2 to about 3 bar and a temperature above about 700° C.

33. The system as claimed in claim 26 further comprising compressing means; quenching means; carbon monoxide recovery means and hydrogen recovery means.

34. The system as claimed in claim 33 further comprising carbon dioxide recovery means.

35. The system as claimed in claim 33 wherein said carbon monoxide recovery means are selected from the group consisting of amine wash, dryer, cold box, membrane process, and a carbon monoxide selective absorption solvent system.

* * * * *